United States Patent [19]

Miyajima et al.

[11] Patent Number: 5,937,896
[45] Date of Patent: Aug. 17, 1999

[54] CHECK VALVE AND SEATING VALVE

[75] Inventors: Masayasu Miyajima; Mitsuharu Hashiba; Nobuyuki Kanda, all of Tokyo, Japan

[73] Assignee: Mitsubishi Denki Kabushiki Kaisha, Tokyo, Japan

[21] Appl. No.: 09/130,465

[22] Filed: Aug. 7, 1998

[51] Int. Cl.[6] .............................. F16K 15/00; F16K 1/00
[52] U.S. Cl. .............. 137/539; 137/533.11; 137/533.13; 251/333
[58] Field of Search .............................. 137/539, 533.11, 137/533.13; 251/333, 334

[56] References Cited

U.S. PATENT DOCUMENTS

| 2,742,054 | 4/1956 | Poundstone | 137/539 |
| 3,547,399 | 12/1970 | Soderquist | 251/334 |
| 5,011,116 | 4/1991 | Alberts et al. | 251/334 |

FOREIGN PATENT DOCUMENTS

| 63-93468 | 6/1988 | Japan . |
| 3-13571 | 3/1991 | Japan . |
| 3-46222 | 9/1991 | Japan . |

*Primary Examiner*—Denise L. Ferensic
*Assistant Examiner*—Joanne Y. Kim
*Attorney, Agent, or Firm*—Sughrue, Mion, Zinn, Macpeak & Seas, PLLC

[57] ABSTRACT

A check valve and a seating valve incur less deformation of a seat, providing good sealing performance. The check valve has: a holding space (36) which is provided in a fluid passage (8); a seating valve (41) which has a main body (41a) having a passage bore (41b) formed along the central axis thereof and a neck (41c) which is vertically provided along the outer peripheral portion of the passage bore (41b) on the end surface at one side of the main body (41a) and which has a seat (41d) formed at the distal end thereof, and which is arranged such that the end surface thereof at the opposite side from the neck (41c) comes into contact with a bottom surface (25a) of a recessed section (25); a valve element (32) which holds a seating surface against the seat (41d); an elastic member (33) which is provided in the holding space (36) in a compressed state to urge the valve element (32) toward the seat (41d); and a fixing member (31) which applies load to a shoulder (41e) of the main body (41a) along the central axis of the main body (41a) so as to secure the seating valve (41) to the bottom of the recessed section (25); wherein a thin wall portion (41g) is formed between the load point of the shoulder (41e) and the seat (41d).

11 Claims, 10 Drawing Sheets

CHECK VALVE AND SEATING VALVE

BACKGROUND OF THE INVENTION

1. Field of the Invention

The present invention relates to a check valve which allows a fluid to run only in one direction and, more particularly, to a check valve and a seating valve having good sealing performance.

2. Description of the Related Art

Diesel engines have been widely known as the type of internal-combustion engines called "cylinder injection internal-combustion engines" or "direct injection internal-combustion engines" wherein fuel is injected in engine cylinders. In recent years, the cylinder injection type has been proposed also for spark ignition engines or gasoline engines. There is a tendency in such a cylinder injection internal-combustion engine to increase fuel injection pressure to produce particulate fuel spray to shorten the fuel injection period in order to achieve higher performance of the engine and to reduce emission gas. An engine provided with a supercharger requires a high fuel injection pressure to match charging pressure at the time of supercharging. For this reason, the fuel supply system in the cylinder injection internal-combustion engine is adapted to provide a sufficiently high fuel injection pressure of, for example, about 10 atm.

FIG. 12 is a system diagram showing a conventional fuel supply system. In FIG. 12, a delivery pipe 1 has injectors 1a of the number corresponding to the number of the cylinders of an engine, which is not shown. A high-pressure fuel pump 3 is disposed between the delivery pipe 1 and a fuel tank 2, the delivery pipe 1 and the high-pressure fuel pump 3 being connected by a high-pressure fuel passage 4. The high-pressure fuel pump 3 and the fuel tank 2 are connected by a low-pressure fuel passage 5.

A drain 6 of the high-pressure fuel pump 3 is routed back to the fuel tank 2. A check valve 7 is provided in the high-pressure fuel passage 4 on the discharge end of the high-pressure fuel pump 3. Provided between the high-pressure fuel passage 4 and the low-pressure fuel passage 5 is a bypass passage 8 to bypass the high-pressure fuel pump 3. A check valve 9 is provided in the middle of the bypass passage 8. The high-pressure fuel pump 3, the bypass passage 8, the check valve 7, and the check valve 9 are integrally constituted to make up a high-pressure fuel pump unit 100.

A low-pressure fuel pump 10 is provided at the end on the side of the fuel tank 2 of the low-pressure fuel passage 5, a filter 11 being provided at the fuel inlet of the low-pressure fuel pump 10. A check valve 12 is provided in the low-pressure fuel passage 5 on the discharge end of the low-pressure fuel pump 10. A low-pressure regulator 14, is provided in the low-pressure fuel passage 5 between the high-pressure fuel pump 3 and the low-pressure fuel pump 10, a filter 15 being provided at the fuel inlet of the low-pressure regulator 14. A drain 16 of the low-pressure regulator 14 is routed back to the fuel tank 2.

The delivery pipe 1 has the high-pressure fuel pump 3 and a high-pressure fuel passage 18 at the opposite end; the high-pressure fuel passage 18 is provided with a high-pressure regulator 20. A drain 21 of the high-pressure regulator 20 is routed back to the fuel tank 2.

FIG. 13 is a cross-sectional view illustrative of the details of the conventional check valve 9; and FIG. 14 is a cross-sectional view of a seating valve. In FIG. 13 and FIG. 14, the check valve 9 is provided in the middle of the bypass passage 8 formed in a casing 3a of the high-pressure fuel pump 3. The check valve 9 will be described in detail. The casing 3a has an approximately cylindrical recessed section 25; the low pressure end or the upstream end of the bypass passage 8 is communicated with a bottom surface 25a of the recessed section 25, while the high pressure end or the downstream end of the bypass passage 8 is communicated with a side surface 25b.

A seating valve 30 is provided at the bottom of the recessed section 25. The seating valve 30 is constituted by a main body 30a which is approximately cylindrical and which has a passage bore 30b formed along the central axis thereof, and a neck 30c which is vertically formed over the full outer periphery of the passage bore 30b on one end surface of the main body 30a. The inner periphery of the distal end of the neck 30c is formed into a slope of about 45 degrees, a seat 30d being formed thereon. An O-ring groove 30f is formed in the outer peripheral surface of the main body 30a, an O-ring 34 being placed in the O-ring groove 30f. The seating valve 30 is fixed to the bottom surface 25a of the recessed section 25 by a shoulder 30e of the main body 30a being pushed by a cap 31.

The cap 31 is approximately cylindrical and it has a recessed section 31a on one end thereof, which is formed along the central axis from an end surface; it is disposed in the recessed section 25 such that it holds the recessed section 31a toward the bottom of the recessed section 25. An O-ring groove 31d is formed in the outer peripheral surface of the cap 31, an O-ring 35 being placed in the O-ring groove 31d. The recessed section 25 and the cap 31 together form a holding space 36 provided in the middle of the bypass passage 8. A cylindrical section 31b formed around the recessed section 31a of the cap 31 has a through hole 31c through which fuel passes. The cap 31 pushes the shoulder 30e of the seating valve 30 at the distal end of the cylindrical section 31b. The other end of the cap 31 is fixed by a plate 38, the plate 38 being secured to the casing 3a with screws 39.

The cap 31 has a ball 32 housed in the recessed section 31a, a spring 33 being provided in a compressed state between the ball 32 and the cap 31. The ball 32 has its entire surface sealed; it comes into contact with the seat 30d. The spring 33 normally pushes the ball 32 against the seat 30d; however, when the fuel pressure at the low pressure end or the upstream end of the bypass passage 8 grows higher than the restoring force of the spring 33, the spring 33 is compressed to allow the fuel to pass through.

The check valve 7 has the same constitution described above.

In the fuel supply apparatus having such a constitution, the fuel which has been pressured to a certain degree by the low-pressure fuel pump 10 is further pressured by the high-pressure fuel pump 3 before it reaches the delivery pipe 1 and injected through the injector 1 a into a cylinder of an engine, which is not shown. At this time, the discharge pressure of the low-pressure fuel pump 10 is stabilized to a predetermined range by the low-pressure regulator 14, while the discharge pressure of the high-pressure fuel pump 3 is stabilized to a predetermined range by the high-pressure regulator 20.

In general, the low-pressure fuel pump 10 is driven by a motor or the like and it runs constantly as long as the power is ON, whereas the high-pressure fuel pump 3 is driven by the engine. Hence, when the engine is started, the fuel cannot be supplied smoothly from the low-pressure fuel passage 5 through the high-pressure fuel pump 3 to the high-pressure fuel passage 4. To permit smooth fuel supply, the bypass passage 8 is provided between the high-pressure fuel passage 4 and the low-pressure fuel passage 5 as described above.

While the engine is running, the high-pressure fuel pump 3 is driven and the high-pressure fuel passage 4 and the high-pressure fuel passage 18 are filled with high-pressure fuel. When the engine is stopped, the supply of pressure to the high-pressure fuel passage 4 and the high-pressure fuel passage 18 is cut off. At this time, if the pressure in the piping runs out, then the temperature at which the fuel evaporates lowers, causing the fuel to evaporate. The evaporation of the fuel adversely affect the starting performance when the engine is started next; therefore, the high-pressure fuel passage 4 and the bypass passage 8 are provided with the check valve 7 and the check valve 9 so that the pressure in the high-pressure fuel passage 4 and the high-pressure fuel passage 18 is maintained at a predetermined level even when the high-pressure fuel pump 3 is stopped.

In the check valve 9 with such a constitution, the seating valve 30 is firmly secured to the bottom surface 25a, of the recessed section 25 to survive the high pressure in the bypass passage 8 and to ensure sealing. Since the shoulder 30e of the seating valve 30 is firmly pressed by the cap 31, the seating valve is deformed. The deformation has been posing a problem because it impairs the sealing performance of the seat 30d and the check valve 9. The same applies to the check valve 7.

FIG. 15 is a sectional view illustrating the deformed seating valve 30. The cap 31 pushes a load point I of the shoulder 30e of the seating valve 30 with a force applied in the direction of the arrow shown in the drawing. This cases the seat 30d to deform by a deformation amount 11; specifically, the seat is deformed outward.

Generally, in order to improve the sealing performance, the seating valve 30 and the ball 32 are preliminarily fitted before they are assembled into the check valve 9. More specifically, the ball 32 is pressed against the seat 30d and the contact portion of the seat 30d is slightly dented. When the seat 30d is deformed as mentioned above, the ball 32 seats at the different contact portion from that described above, failing to improve the sealing performance.

The distal ends of the shoulder 30e of the seating valve 30 and the cap 31 inevitably incur slight dimensional errors although they are machined with high accuracy; the force pushing the shoulder 30e of the seating valve 30 does not stay constant in the peripheral direction because of the dimensional errors. As a result, the amount of deformation 11 shown in FIG. 15 is not constant along the periphery; the deformation undulates. This makes it easier for a gap to be produced between the ball 32 and the seat 30d with consequent deteriorated sealing performance.

SUMMARY OF THE INVENTION

Accordingly, the present invention has been made with a view toward solving the problem described above, and it is an object thereof to provide a check valve and a seating valve which incur controlled deformation of a seat and which provides good sealing performance.

To this end, according to one aspect of the present invention, there is provided a check valve equipped with: a holding space which is provided in a fluid passage, one end of which is formed into a cylindrical recessed section, with the upstream portion of the fluid passage being communicated with the bottom surface of the recessed section, while the downstream portion of the fluid passage being communicated with the other end; a seating valve which is placed in the holding space, which has a columnar main body having a passage bore formed along the central axis thereof and a shoulder formed on the outer peripheral portion of the end surface at one side thereof, and a neck that is vertically provided along the outer periphery of the passage bore at the central portion of the end surface at the side where the shoulder of the main body is located and that has a seat formed at the distal end thereof, and which is arranged such that the end surface thereof at the opposite side from the neck of the main body comes into contact with the bottom surface of the recessed section; a valve element which is placed in the holding space and which holds contactably a seating surface against the seat; an elastic member which is provided in the holding space in a compressed state to urge the valve element toward the seat; and a fixing member which applies load to the shoulder along the central axis of the main body so as to secure the seating valve to the bottom of the recessed section; wherein a thin wall portion is formed between the load point of the shoulder and the seat.

According to another aspect of the present invention, there is provided a check valve equipped with: a holding space which is provided in a fluid passage, one end of which is formed into a cylindrical recessed section, with the upstream portion of the fluid passage being communicated with the bottom surface of the recessed section, while the downstream portion of the fluid passage being communicated with the other end; a seating valve which is placed in the holding space, which has a columnar main body having a passage bore formed along the central axis thereof and a shoulder formed on the outer peripheral portion of the end surface at one side thereof, and a neck that is vertically provided along the outer periphery of the passage bore at the central portion of the end surface at the side where the shoulder of the main body is located and that has a seat formed at the distal end thereof, and which is press-fitted in the recessed section such that the end surface thereof at the opposite side from the neck of the main body comes into contact with the bottom surface of the recessed section; a valve element which is placed in the holding space and which holds contactably a seating surface against the seat; and an elastic member which is provided in the holding space in a compressed state to urge the valve element toward the seat; wherein a thin wall portion is formed between the seat and the main body.

In a preferred form of the check valve, the thin wall portion is formed by annularly removing the wall thickness of the outer periphery of the neck.

In another preferred form of the check valve, the thin wall portion is formed by annularly removing the wall thickness of the base of the shoulder.

In a further preferred form of the check valve, the thin wall portion is formed so that the shoulder is thinner than the neck.

In a further preferred form of the check valve, the valve element is ball type.

In a further preferred form of the check valve, the valve element is poppet type.

According to a further aspect of the present invention, there is provided a seating valve equipped with: a columnar main body which has a passage bore formed along the central axis thereof and which has a shoulder on the outer peripheral portion of the end surface at one side thereof, and a neck which is vertically provided along the outer periphery of the passage bore at the center of the end surface at the side where the shoulder of the main body is located and which has a seat formed at the distal end thereof; wherein the seating valve is secured in a holding space, which is provided in a fluid passage, one end of which is formed into a cylindrical recessed section, with the upstream portion of the fluid passage being communicated with the bottom surface of the recessed section, while the downstream portion of the fluid passage being communicated with the other end, by bringing the end surface at the opposite side from the neck of the main body into contact with the bottom surface of the recessed section and pressing the shoulder along the central axis; a thin wall portion being formed between the load point of the shoulder and the seat.

According to yet another aspect of the present invention, there is provided a seating valve equipped with: a columnar main body which has a passage bore formed along the central axis thereof and which has a shoulder on the outer peripheral portion of the end surface at one side thereof, and a neck which is vertically provided along the outer periphery of the passage bore at the center of the end surface at the side where the shoulder of the main body is located and which has a seat formed at the distal end thereof; wherein the seating valve is secured in a holding space, which is provided in a fluid passage, one end of which is formed into a cylindrical recessed section, with the upstream portion of the fluid passage being communicated with the bottom surface of the recessed section, while the downstream portion of the fluid passage being communicated with the other end, by press-fitting the main body in the recessed section such that the end surface at the opposite side from the neck of the main body comes into contact with the bottom surface of the recessed section; a thin wall portion being formed between the seat and the main body.

In a preferred form of the seating valve, the thin wall portion is formed by annularly removing the wall thickness of the outer periphery of the neck.

In another preferred form of the seating valve, the thin wall portion is formed by annularly removing the wall thickness of the base of the shoulder.

In a further preferred form of the seating valve, the thin wall portion is formed so that the shoulder is thinner than the neck.

DESCRIPTION OF THE PREFERRED EMBODIMENTS

First Embodiment

Figure 1:
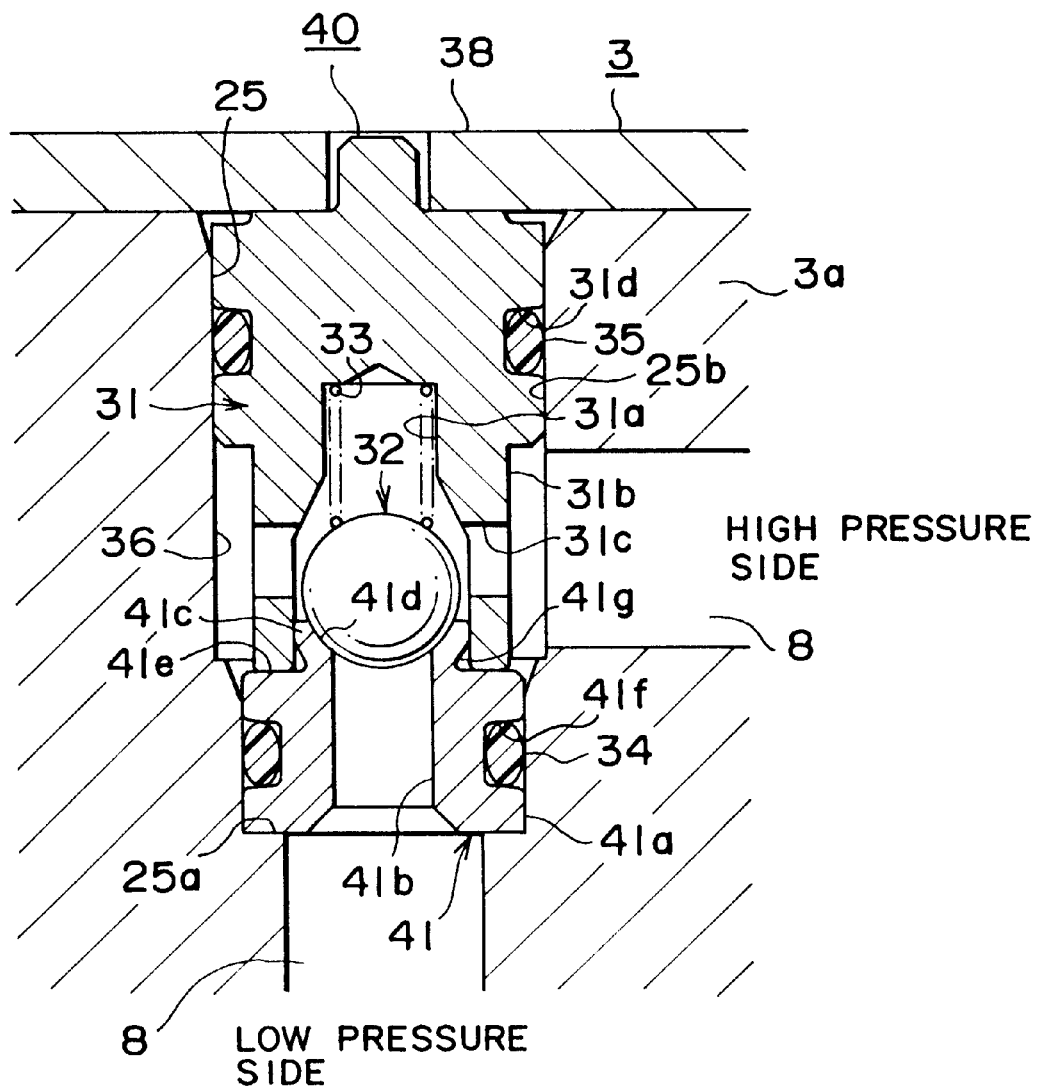
FIG. 1 is a sectional view of a check valve in accordance with the present invention.
Figure 2:
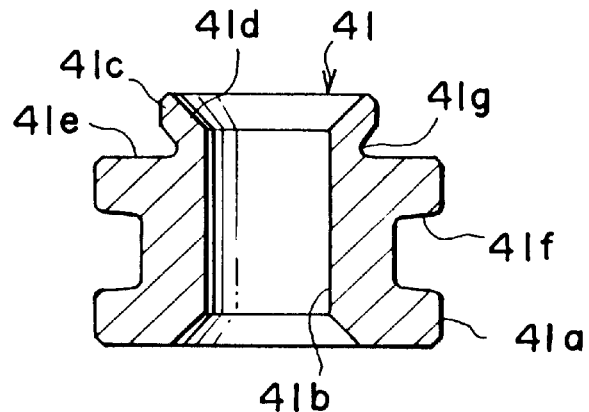
FIG. 2 is a sectional view of the seating valve.

FIG. 1 is a sectional view of a check valve in accordance with the present invention; and FIG. 2 is a sectional view of a seating valve. In FIG. 1 and FIG. 2, a check valve 40 is provided in the middle of a bypass passage 8 which is a fluid passage formed in a casing 3a of a high-pressure fuel pump 3. The check valve 40 will be described in detail. Formed in the casing 3a is a nearly cylindrical recessed section 25. In the recessed section 25, the low pressure end or the upstream end of the bypass passage 8 is communicated with a bottom surface 25a, while the high pressure end or the downstream end of the bypass passage 8 is communicated with a side surface 25b.

A seating valve 41 is provided at the bottom of the recessed section 25. The seating valve 41 is composed of a nearly columnar main body 41a which is made of, for example, stainless steel, and which has a passage bore 41b formed along the central axis, and a neck 41c which is vertically provided fully around the outer periphery of the passage bore 41b on the end surface at one end of the main body 41a. The inner periphery of the distal end of the neck 41c is formed into a slope of about 45 degrees toward the center thereof, a seat 41d being formed thereon. The outer peripheral portion of the neck 41c which is the rear of the seat 41d is partly made thinner annularly to form a thin wall portions. An O-ring groove 41f is formed in the outer peripheral surface of the main body 41a, and an O-ring 34 is placed in the O-ring groove 41f. The seating valve 41 is secured to the bottom surface 25a of the recessed section 25 by a shoulder 41e of the main body 41a being pushed by a cap 31, which serves as a fixing member, along the central axis.

The cap 31 is made of, for example, stainless steel, and it is approximately columnar; it has a recessed section 31a on one end thereof, which is formed along the central axis from an end surface, and it is disposed in the recessed section 25 such that it holds the recessed section 31a toward the bottom of the recessed section 25. An O-ring groove 31d is formed in the outer peripheral surface of the cap 31, an O-ring 35 being placed in the O-ring groove 31d. The recessed section 25 and the cap 31 together form a holding space 36 provided in the middle of the bypass passage 8. A cylindrical section 31b formed around the recessed section 31a of the cap 31 has a through hole 31c through which fuel passes. The cap 31 pushes the shoulder 41e of the seating valve 41 at the distal end of the cylindrical section 31b. The other end of the cap 31 is fixed by a plate 38, the plate 38 being secured to the casing 3a with screws which are not shown.

The cap 31 has a ball 32 serving as the valve element housed in the recessed section 31a. A spring 33, which is an elastic member, is provided in a compressed state between the ball 32 and the cap 31. The ball 32 has its entire surface sealed; it come into contact with the seat 41d. The spring 33 normally pushes the ball 32 against the seat 41d; however, when the fuel pressure at the low pressure end or the upstream end of the bypass passage 8 grows higher than the restoring force of the spring 33, the spring 33 yields to the fuel pressure and it is compressed to allow the fuel to pass through.

The check valve 40 constituted as described above is provided in the middle of the bypass passage 8 to prevent fuel from flowing back and maintain the pressure in the bypass passage 8 at a predetermined level. The same check valve 40 is provided also in a high-pressure fuel passage 4.

Figure 3:
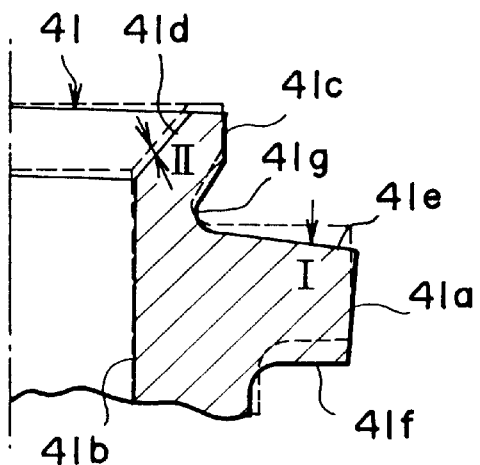
FIG. 3 is a sectional view showing a deformed seating valve.

FIG. 3 is a sectional view showing a deformed seating valve 41. The cap 31 pushes a load point I of the shoulder 41e of the seating valve 41 with a force applied in the direction of the arrow shown in the drawing. The outer peripheral portion of the neck 41c has been partly made thinner annularly to provide the thin wall portion 41g, making it difficult for the deformation of the shoulder 41e to be transmitted to the seat 41d. As a result, the seat 41d deforms only by a deformation amount 11; this deformation is smaller than that in the prior art.

In the check valve 40 thus configured, since the outer peripheral portion of the neck 41c of the seating valve 41 has been partly made thinner in an annular fashion to form the thin wall portion 41g, the seat 41d deforms less than that in the prior art. This leads to better sealing performance of the ball 32 and the seat 41d. Moreover, the seating valve 41 can be secured using a larger pushing force, permitting it to be employed for a further higher pressure fuel passage. In addition, the uneven pushing force for fixing the seating valve 41 can be allowed to a certain extent, permitting less strict machining accuracy for the seating valve 41 and the cap 31.

Second Embodiment

Figure 4:
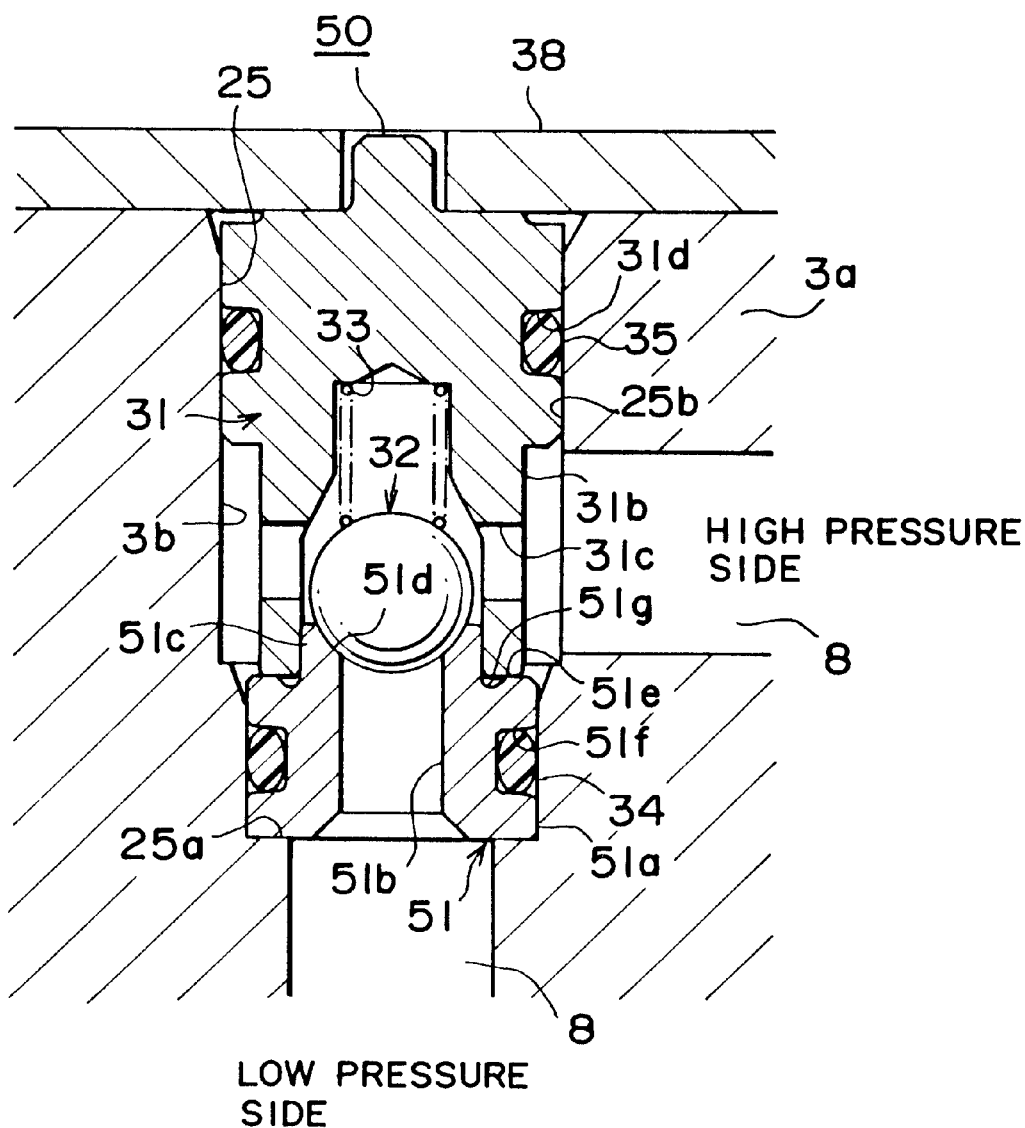
FIG. 4 is a sectional view showing another example of the check valve in accordance with the present invention.
Figure 5:
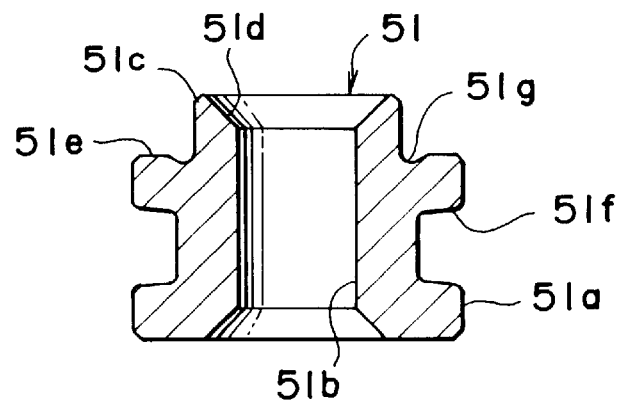
FIG. 5 is a sectional view of the seating valve.

FIG. 4 is a sectional diagram showing another example of the check valve in accordance with the present invention; and FIG. 5 is a sectional view of a seating valve. In FIG. 4 and FIG. 5, a check valve 50 is provided in the middle of a bypass passage 8. A seating valve 51 is composed of a nearly columnar main body 51a having a passage bore 51b formed along the central axis, and a neck 51c vertically provided fully around the outer periphery of the passage bore 51b on the end surface at one end of the main body 51a. The inner periphery of the distal end of the neck 51c is formed into a slope of about 45 degrees toward the center thereof, a seat 51d being formed thereon. Formed in the outer peripheral surface of the main body 51a is an O-ring groove 51f, an O-ring 34 being placed in the O-ring groove 51f. The seating valve 51 is secured to a bottom surface 25a of a recessed section 25 by a shoulder 51e of the main body 51a being pushed by a cap 31. The base portion of the shoulder 51e is partly made thinner annularly to form a thin wall portion 51g. The rest of the constitution is the same as the first embodiment.

Figure 6:
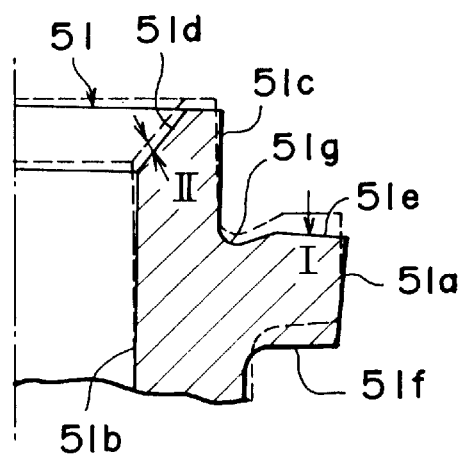
FIG. 6 is a sectional view showing a deformed seating valve.

FIG. 6 is a sectional view showing the seating valve 51 when it has been deformed. The cap 31 pushes a load point I of the shoulder 51e of the seating valve 51 with a force applied in the direction of the arrow shown in the drawing. The base portion of the shoulder 51e has been partly made thinner annularly to provide the thin wall portion 51g, making it difficult for the deformation of the shoulder 51e to be transmitted to the seat 51d. As a result, the seat 51d deforms only by a deformation amount 11; this deformation is smaller than that in the prior art.

In the check valve 50 thus configured, since the base portion of the shoulder 51e has been partly made thinner in an annular fashion to form the thin wall portion 51g, the seat 51d deforms less than that in the prior art. This leads to better sealing performance and provides the same advantage as that obtained by the first embodiment. Moreover, since the thin wall portion 51g is formed at the base of the shoulder 51e, it is easy to machine.

Third Embodiment

Figure 7:
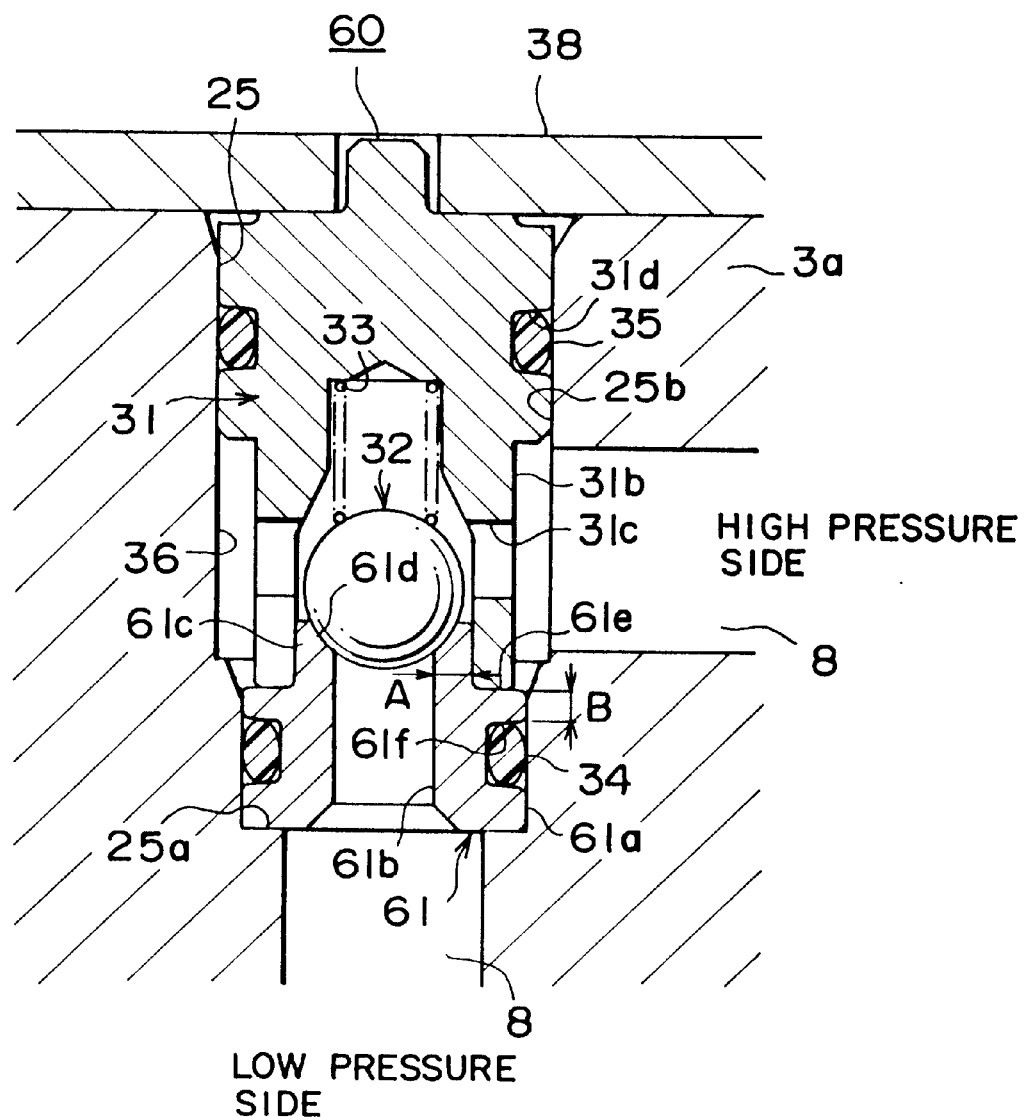
FIG. 7 is a sectional view showing another example of the check valve in accordance with the present invention.
Figure 8:
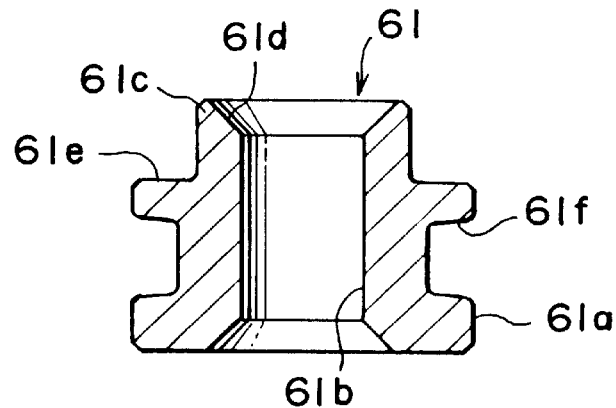
FIG. 8 is a sectional view of the seating valve.

FIG. 7 is a sectional diagram showing another example of the check valve in accordance with the present invention; and FIG. 8 is a sectional view of a seating valve. In FIG. 7 and FIG. 8, a check valve 60 is provided in the middle of a bypass passage 8. A seating valve 61 is composed of a nearly columnar main body 61a having a passage bore 61b formed along the central axis, and a neck 61c vertically provided fully around the outer periphery of the passage bore 61b on the end surface at one end of the main body 61a. The inner periphery of the distal end of the neck 61c is formed into a slope of about 45 degrees toward the center thereof, a seat 61d being formed thereon. Formed in the outer peripheral surface of the main body 61a is an O-ring groove 61f, an O-ring 34 being placed in the O-ring groove 61f. The seating valve 61 is secured to a bottom surface 25a of a recessed section 25 by a shoulder 61e of the main body 61 a being pushed by a cap 31. In this embodiment, a thickness B of the shoulder 61e is made thinner than a thickness A of the neck 61c, wherein the thickness B of the shoulder 61e means the distance from the end surface of the main body 61a on the side of the neck 61c to the top of the O-ring groove 61f of FIG. 7. The rest of the constitution is the same as the first embodiment.

Figure 9:
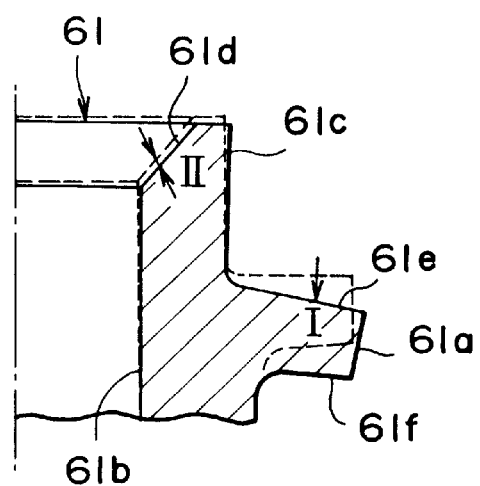
FIG. 9 is a sectional view showing a deformed seating valve.

FIG. 9 is a sectional view showing the seating valve 61 when it has been deformed. The cap 31 pushes a load point I of the shoulder 61e of the seating valve 61 with a force applied in the direction of the arrow shown in the drawing. The thickness B of the shoulder 61e is made thinner than the thickness A of the neck 61c, making it difficult for the deformation of the shoulder 61e to be transmitted to the seat 61d. As a result, the seat 61d deforms only by a deformation amount 11; this deformation is smaller than that in the prior art.

In the check valve 60 thus configured, since the shoulder 61e is thinner than the neck 61c, the seat 61d deforms less than that in the prior art. This leads to better sealing performance and provides the same advantage as that obtained by the first embodiment. Moreover, the thin wall portion can be machined further easily since the shoulder 61e is formed thinner.

In this embodiment, the thickness B of the shoulder 61e equals to the dimension from the end surface of the main body 61a on the side of the neck 61c to the top edge of the O-ring groove 61f of FIG. 7; if the O-ring groove 61f is absent, then the thickness B of the shoulder will be equal to the thickness of the main body. In the case of the seating valve having such a shape, if, for example, an elastic member such as a sealing member is provided between the bottom end surface of the main body and the bottom surface 25a shown in FIG. 7, the same advantage as that obtained by this embodiment can be achieved if the thickness B of the shoulder is smaller than the thickness A of the neck.

Fourth Embodiment

Figure 10:
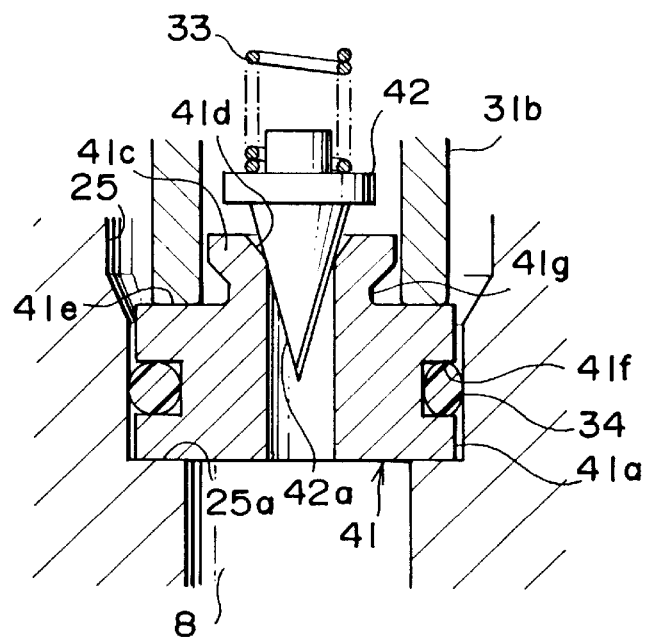
FIG. 10 is a sectional view showing still another example of the check valve in accordance with the present invention.

FIG. 10 is a sectional view showing still another example of the check valve in accordance with the present invention. In FIG. 10, a poppet type valve element 42 is employed for this embodiment. The valve element 42 is approximately conical, a conical seat surface 42a being held against a seat 41d of a seating valve 41. The rest of the constitution is identical to the first embodiment.

This check valve thus configured also provides the same advantages as that of the first embodiment.

Fifth Embodiment

Figure 11:
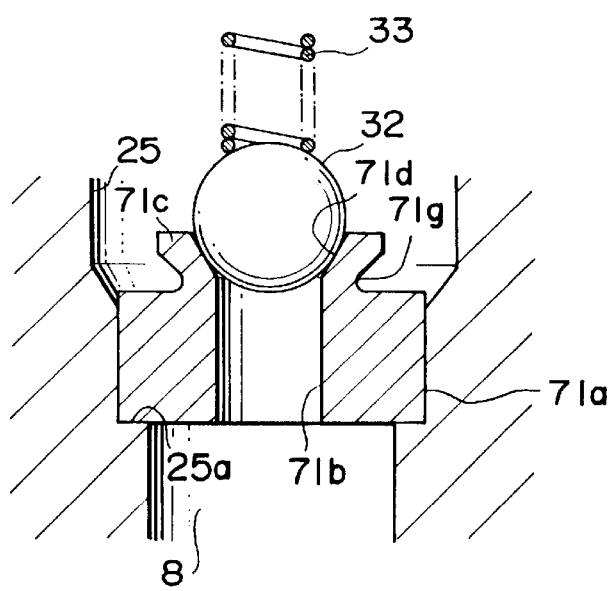
FIG. 11 is a sectional view showing yet another example of the check valve in accordance with the present invention.
Figure 12:
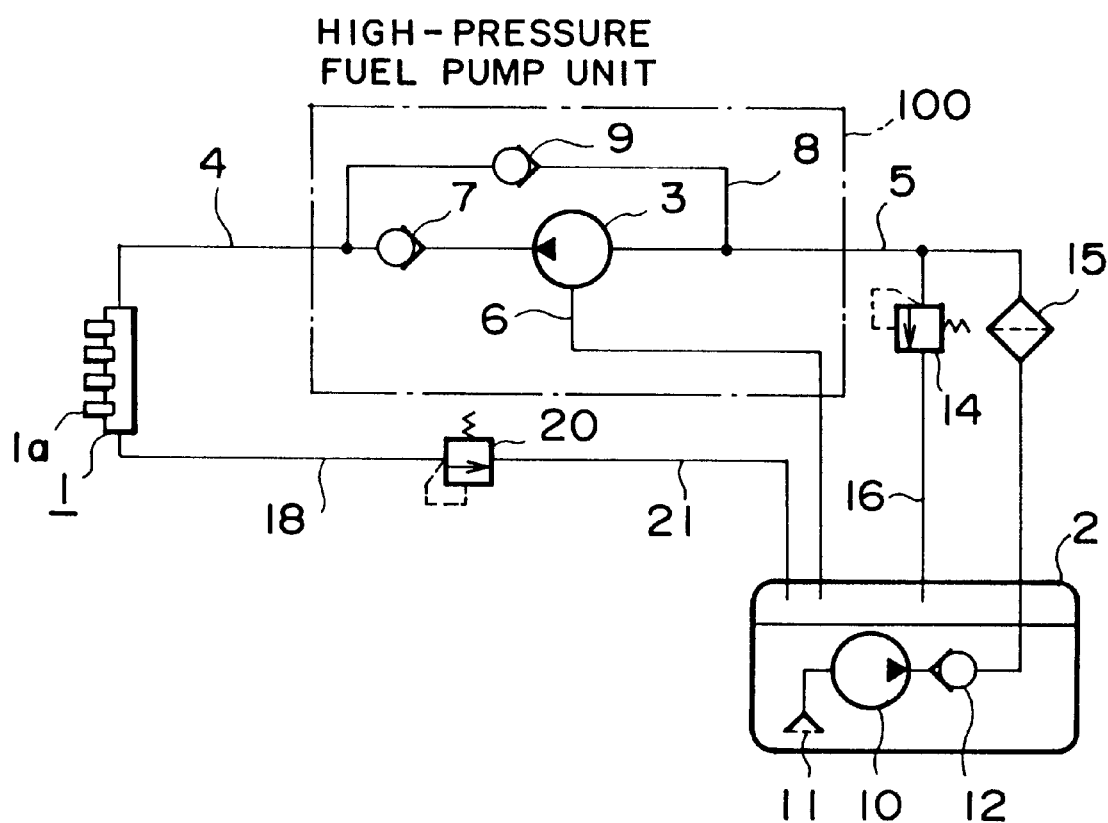
FIG. 12 is a system diagram showing a conventional fuel supply system.
Figure 13:
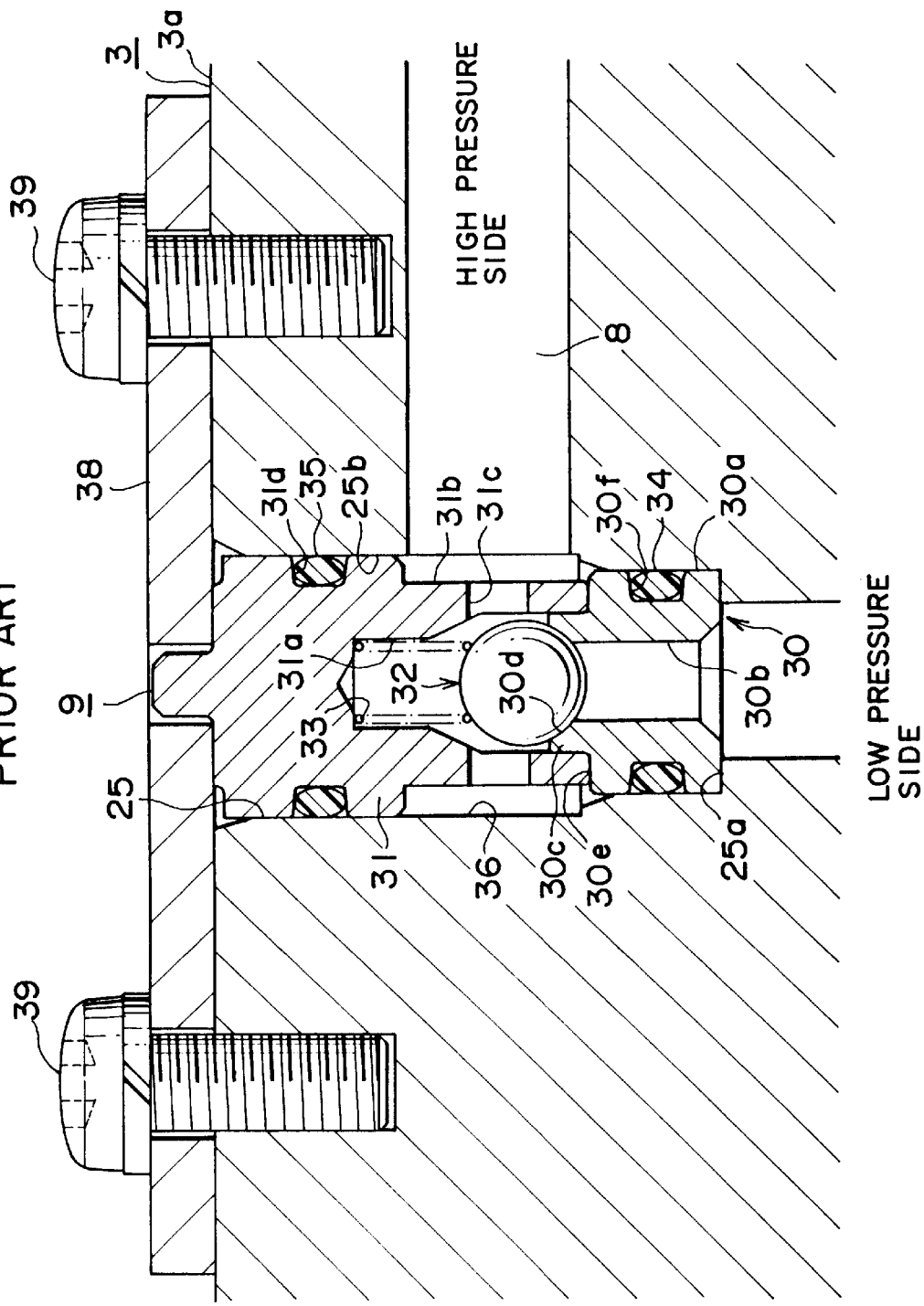
FIG. 13 is a sectional view showing the details of a conventional check valve.
Figure 14:
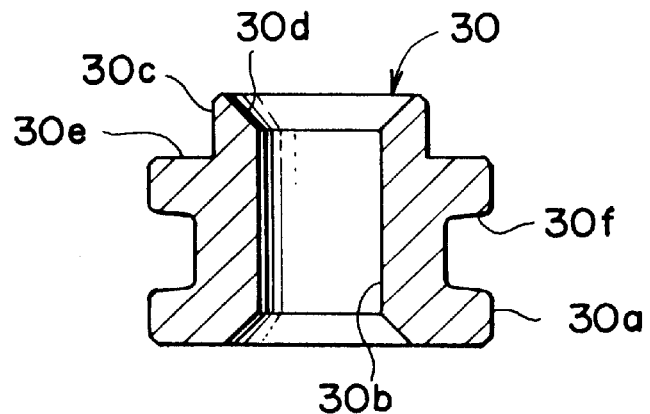
FIG. 14 is a sectional view showing a conventional seating valve.
Figure 15:
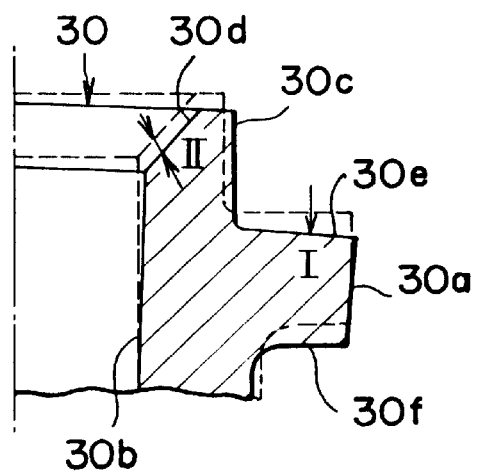
FIG. 15 is a sectional view showing a deformed conventional seating valve.

FIG. 11 is a sectional view showing yet another example of the check valve in accordance with the present invention. In FIG. 11, a seating valve 71 of this embodiment is composed of a nearly columnar main body 71 a having a passage bore 71b formed along the central axis, and a neck 71c vertically provided fully around the outer periphery of the passage bore 71b on the end surface at one end of the main body 71a. The inner periphery of the distal end of the neck 71c is formed into a slope of about 45 degrees toward the center thereof, a seat 71d being formed thereon. The outer peripheral portion of the neck 71c which is the rear of the seat 71d is partly made thinner annularly to form a thin wall portion 71g. The seating valve 71 is secured to a bottom surface 25a of a recessed section 25 by the main body 71a being press-fitted in the recessed section 25. The rest of the constitution is identical to the first embodiment.

In the check valve thus configured, the seating valve 71 deforms when subjected to a radial pushing force since it has the main body 71a press-fitted in the recessed section 25; however, the seat 71d deforms less since the outer peripheral portion of the neck 71d has been partly made thinner in an annular fashion to form the thin wall portion 71g. Thus, the same advantage as that obtained by the first embodiment can be achieved.

As described above, the check valve in accordance with one aspect of the present invention has: a holding space which is provided in a fluid passage, one end of which is formed into a cylindrical recessed section, with the upstream portion of the fluid passage being communicated with the bottom surface of the recessed section, while the downstream portion of the fluid passage being communicated with the other end; a seating valve which is placed in the holding space, which has a columnar main body having a passage bore formed along the central axis thereof and a shoulder formed on the outer peripheral portion of the end surface at one side thereof, and a neck that is vertically provided along the outer periphery of the passage bore at the central portion of the end surface at the side where the shoulder of the main body is located and that has a seat formed at the distal end thereof, and which is arranged such that the end surface thereof at the opposite side from the neck of the main body comes into contact with the bottom surface of the recessed section; a valve element which is placed in the holding space and which holds contactably a seating surface against the seat; an elastic member which is provided in the holding space in a compressed state to urge the valve element toward the seat; and a fixing member which applies load to the shoulder along the central axis of the main body so as to secure the seating valve to the bottom of the recessed section; wherein a thin wall portion is formed between the load point of the shoulder and the seat. Hence, the seat deforms less than that of the prior art. This leads to improved sealing performance of the valve element and the seat, and it also permits the seating valve to be secured with a larger pressing force, enabling the seating valve to be used for a passage of higher pressure. In addition, an uneven pushing force for fixing the seating valve can be allowed to a certain extent; easing the machining accuracy for the seating valve and the fixing member.

The check valve in accordance with another aspect of the present invention has: a holding space which is provided in a fluid passage, one end of which is formed into a cylindrical recessed section, with the upstream portion of the fluid passage being communicated with the bottom surface of the recessed section, while the downstream portion of the fluid passage being communicated with the other end; a seating valve which is placed in the holding space, which has a columnar main body having a passage bore formed along the central axis thereof and a shoulder formed on the outer peripheral portion of the end surface at one side thereof, and a neck that is vertically provided along the outer periphery of the passage bore at the central portion of the end surface at the side where the shoulder of the main body is located and that has a seat formed at the distal end thereof, and which is arranged such that the end surface thereof at the opposite side from the neck of the main body come into contact with the bottom surface of the recessed section; a valve element which is placed in the holding space and which holds contactably a seating surface against the seat; an elastic member which is provided in the holding space in a compressed state to urge the valve element toward the seat; and a fixing member which applies load to the shoulder along the central axis of the main body so as to secure the seating valve to the bottom of the recessed section; wherein a thin wall portion is formed between the load point of the shoulder and the seat. This makes it hard for the deformation of the main body, which takes place when the main body is press-fitted in the recessed section, to be transmitted to the seat, so that the seat deforms less than that of the prior art. As a result, the sealing performance of the valve element and the seat is improved.

In a preferred form of the check valve, the thin wall portion is formed by annularly removing the wall thickness of the outer periphery of the neck. This makes it easy to form the thin wall portion.

In another preferred form of the check valve, the thin wall portion is formed by annularly removing the wall thickness of the base of the shoulder. This makes it even easier to form the thin wall portion.

In a further preferred form of the check valve, the thin wall portion is formed so that the shoulder is thinner than the neck. This makes it still easier to form the thin wall portion.

In a further preferred form of the check valve, the valve element is ball type. This makes it possible to improve the sealing performance in a check valve having the ball type valve element.

In a further preferred form of the check valve, the valve element is poppet type. This makes it possible to improve the sealing performance in a check valve having the poppet type valve element.

The seating valve in accordance with another aspect of the present invention has: a columnar main body which has a passage bore formed along the central axis thereof and which has a shoulder on the outer peripheral portion of the end surface at one side thereof, and a neck which is vertically provided along the outer periphery of the passage bore at the center of the end surface at the side where the shoulder of the main body is located and which has a seat formed at the distal end thereof; wherein the seating valve is secured in a holding space, which is provided in a fluid passage, one end of which is formed into a cylindrical recessed section, with the upstream portion of the fluid passage being communicated with the bottom surface of the recessed section, while the downstream portion of the fluid passage being communicated with the other end, by bringing the end surface at the opposite side from the neck of the main body into contact with the bottom surface of the recessed section and pressing the shoulder along along the central axis; a thin wall portion being formed between the load point of the shoulder and the seat. This leads to improved sealing performance of the valve element and the seat, and it also permits the seating valve to be secured with a larger pressing force, enabling the seating valve to be used for a fuel passage of higher pressure. In addition, an uneven pushing force for fixing the seating valve can be allowed to a certain extent, easing the machining accuracy for the seating valve.

The seating valve according to yet another aspect of the present invention has: a columnar main body which has a passage bore formed along the central axis thereof and which has a shoulder on the outer peripheral portion of the end surface at one side thereof, and a neck which is vertically provided along the outer periphery of the passage bore at the center of the end surface at the side where the shoulder of the main body is located and which has a seat formed at the distal end thereof; wherein the seating valve is secured in a holding space, which is provided in a fluid passage, one end of which is formed into a cylindrical recessed section, with the upstream portion of the fluid passage being communicated with the bottom surface of the recessed section, while the downstream portion of the fluid passage being communicated with the other end, by press-fitting the main body in the recessed section such that the end surface at the opposite side from the neck of the main body comes into contact with the bottom surface of the recessed section; a thin wall portion being formed between the seat and the main body. Thus, the deformation of the main body which takes place when the main body is press-fitted in the recessed section is hard to be transmitted to the seat. As a result, the seat deforms less with consequent improved sealing performance of the valve element and the seat.

In a preferred form of the seating valve, the thin wall portion is formed by annularly removing the wall thickness of the outer periphery of the neck. This makes it easy to form the thin wall portion.

In another preferred form of the seating valve, the thin wall portion is formed by annularly removing the wall thickness of the base of the shoulder. This makes it even easier to form the thin wall portion.

In a further preferred form of the seating valve, the thin wall portion is formed so that the shoulder is thinner than the neck. This makes it still easier to form the thin wall portion.

What is claimed is:

1. A check valve comprising:
    a holding space provided in a fluid passage, one end of which is formed into a cylindrical recessed section, with the upstream portion of said fluid passage being communicated with the bottom surface of said recessed section, while the downstream portion of said fluid passage being communicated with the other end;
    a seating valve disposed in said holding space, which has a columnar main body having a passage bore formed along the central axis thereof and a shoulder formed on the outer peripheral portion of the end surface at one side thereof, and a neck that is vertically provided along the outer periphery of said passage bore at the central portion of the end surface at the side where said shoulder of said main body is located and that has a seat formed at the distal end thereof, and which is arranged such that the end surface thereof at the opposite side from said neck of said main body comes into contact with the bottom surface of said recessed section;
    a valve element disposed in said holding space and which holds contactably a seating surface against said seat;
    an elastic member provided in said holding space in a compressed state to urge said valve element toward said seat; and
    a fixing member which applies load to said shoulder along the central axis of said main body so as to secure said seating valve to the bottom of said recessed section;
    wherein a wall portion of reduced thickness relative to one of the neck and the shoulder is formed between a load point of said shoulder at which the fixing member applies a load, and said seat, to reduce deformation of said seat in response to the load application.

2. A check valve according to claim 1, wherein said thin wall portion is formed by annularly removing the wall thickness of a outer periphery of said neck.

3. A check valve according to claim 1, wherein said thin wall portion is formed by annularly removing the wall thickness of a base portion of said shoulder.

4. A check valve according to claim 1, wherein said valve element is a ball type.

5. A check valve according to claim 1, wherein said valve element is a poppet type.

6. A check valve comprising:
    a holding space provided in a fluid passage, one end of which is formed into a cylindrical recessed section, with the upstream portion of said fluid passage being communicated with the bottom surface of said recessed section, while the downstream portion of said fluid passage being communicated with the other end;
    a seating valve disposed in said holding space, which has a columnar main body having a passage bore formed along the central axis thereof and a shoulder formed on the outer peripheral portion of the end surface at one side thereof, and a neck that is vertically provided along the outer periphery of said passage bore at the central portion of the end surface at the side where said shoulder of said main body is located and that has a seat formed at the distal end thereof, and which is press-fitted in said recessed section such that the end surface thereof at the opposite side from said neck of said main body comes into contact with the bottom surface of said recessed section;
    a valve element disposed in said holding space and which holds contactably a seating surface against said seat; and
    an elastic member provided in said holding space in a compressed state to urge said valve element toward said seat;
    wherein a wall portion of the neck between said seat and said main body is formed with a reduced thickness to reduce deformation of said seat in response to the application of a load to said shoulder.

7. A seating valve comprising:
    a columnar main body which has a passage bore formed along the central axis thereof and which has a shoulder on the outer peripheral portion of the end surface at one side thereof, and a neck which is vertically provided along the outer periphery of said passage bore at the center of the end surface at the side where said should of said main body is located and which has a seat formed at the distal end thereof;
    wherein said seating valve is secured in a holding space, which is provided in a fluid passage, one end of which is formed into a cylindrical recessed section, with the upstream portion of said fluid passage being communicated with the bottom surface of the recessed section, while the downstream portion of said fluid passage being communicated with the other end, by bringing the end surface at the opposite side from said neck of said main body into contact with the bottom surface of said recessed section and pressing said shoulder along the central axis; and
    wherein a wall portion of reduced thickness relative to one of the neck and shoulder is formed between a load point of said shoulder at which the fixing member applies a load, and said seat, to reduce deformation of said seat in response to the load application.

8. A seating valve according to claim 7, wherein said thin wall portion is formed by annularly removing the wall thickness of an outer periphery of said neck.

9. A seating valve according to claim 7, wherein said thin wall portion is formed by annularly removing the wall thickness of a base portion of said shoulder.

10. A seating valve comprising:
- a columnar main body which has a passage bore formed along the central axis thereof and which has a shoulder on the outer peripheral portion of the end surface at one side thereof, and a neck which is vertically provided along the outer periphery of said passage bore at the center of the end surface at the side where said shoulder of said main body is located and which has a seat formed at the distal end thereof;
- wherein said seating valve is secured in a holding space, which is provided in a fluid passage, one end of which is formed into a cylindrical recessed section, with the upstream portion of said fluid passage being communicated with the bottom surface of the recessed section, while the downstream portion of said fluid passage being communicated with the other end, by press-fitting said main body in said recessed section such that the end surface at the opposite side from said neck of said main body comes into contact with the bottom surface of said recessed section; and
- wherein a wall portion of the neck between said seat and said main body is formed with a reduced thickness to reduce deformation of said seat in response to the application of a load to said shoulder.

11. A check valve comprising:
- a holding space provided in a fluid passage, one end of which is formed into a cylindrical recessed section, with the upstream portion of said fluid passage being communicated with the bottom surface of said recessed section, while the downstream portion of said fluid passage being communicated with the other end;
- a seating valve disposed in said holding space, which has a columnar main body having a passage bore formed along the central axis thereof and a shoulder formed on the outer peripheral portion of the end surface at one side thereof, and a neck that is vertically provided along the outer periphery of said passage bore at the central portion of the end surface at the side where said shoulder of said main body is located and that has a seat formed at the distal end thereof, and which is arranged such that the end surface thereof at the opposite side from said neck of said main body comes into contact with the bottom surface of said recessed section;
- a valve element disposed in said holding space and which holds contactably a seating surface against said seat;
- an elastic member provided in said holding space in a compressed state to urge said valve element toward said seat; and
- a fixing member which applies load to said shoulder along the central axis of said main body so as to secure said seating valve to the bottom of said recessed section;
- wherein a thickness of said shoulder is less than a thickness of said neck to reduce deformation of said seat in response to the load application.

* * * * *